(12) United States Patent
Robin et al.

(10) Patent No.: US 11,959,553 B2
(45) Date of Patent: Apr. 16, 2024

(54) VALVE FOR CONTROLLING A COOLANT CIRCUIT

(71) Applicant: OTTO EGELHOF GmbH & Co. KG, Fellbach (DE)

(72) Inventors: Jean-Jacques Robin, Berglen (DE); Andreas Ehmen, Wilhelmshaven (DE); Eike Willers, Stuttgart (DE); Volker Von Rad, Esslingen (DE); Peter Bohnenstengel, Esslingen (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 0 days.

(21) Appl. No.: 17/716,252

(22) Filed: Apr. 8, 2022

(65) Prior Publication Data

US 2022/0333701 A1 Oct. 20, 2022

(30) Foreign Application Priority Data

Apr. 16, 2021 (DE) .......................... 102021109701.0

(51) Int. Cl.
| | | |
|---|---|---|
| *F16K 11/074* | (2006.01) | |
| *F16K 11/085* | (2006.01) | |
| *F16K 31/04* | (2006.01) | |
| *F25B 41/26* | (2021.01) | |
| *F25B 41/20* | (2021.01) | |

(52) U.S. Cl.
CPC ........ *F16K 11/074* (2013.01); *F16K 11/0853* (2013.01); *F16K 31/043* (2013.01); *F25B 41/26* (2021.01); *F25B 41/20* (2021.01)

(58) Field of Classification Search
CPC .. F16K 11/074; F16K 11/0853; F16K 31/043; F25B 41/26; F25B 41/20
See application file for complete search history.

(56) References Cited

U.S. PATENT DOCUMENTS

| | | | | |
|---|---|---|---|---|
| 1,489,396 | A | * | 4/1924 | Odum ..................... F15B 13/06 |
| | | | | 137/625.21 |
| 2,653,003 | A | | 9/1953 | Overbeke |
| 3,473,551 | A | | 10/1969 | Murauskas |
| 4,286,624 | A | * | 9/1981 | Clausen ................ F16K 11/207 |
| | | | | 137/255 |

(Continued)

FOREIGN PATENT DOCUMENTS

| | | | | |
|---|---|---|---|---|
| DE | 102017102841 | | 8/2018 | |
| WO | WO-2021049222 A1 | * | 3/2021 | ................ F01P 7/16 |

*Primary Examiner* — Matthew W Jellett
*Assistant Examiner* — Christopher D Ballman
(74) *Attorney, Agent, or Firm* — KRIEGSMAN & KRIEGSMAN (57) ABSTRACT

The invention relates to a valve for controlling a coolant circuit of a refrigerating system, having a housing, which has at least one inlet opening and at least one outlet opening, having a regulating chamber provided in the housing, which extends between the at least one inlet opening and the at least one outlet opening, having a valve arrangement, which is insertable at least partially into the regulating chamber, having a rotary slide arrangement, arranged in the regulating chamber, which has a control disc, which is rotatable in relation to the at least one rotary slide support, the at least one rotary slide support is provided non-rotationally to the housing and the at least one rotary slide support is mounted floatingly to the housing.

16 Claims, 9 Drawing Sheets

(56) References Cited

U.S. PATENT DOCUMENTS

| | | | | |
|---|---|---|---|---|
| 4,501,297 A * | 2/1985 | Baker | .................. | F16K 31/045 |
| | | | | 137/554 |
| 4,574,840 A * | 3/1986 | Schumann | .......... | F16K 11/0856 |
| | | | | 137/625.46 |
| 4,890,645 A * | 1/1990 | Andersen | ............ | F16K 11/0743 |
| | | | | 137/625.21 |
| 5,413,143 A * | 5/1995 | d'Agostino | ......... | F16K 11/0743 |
| | | | | 137/625.11 |
| 5,694,967 A * | 12/1997 | Schultz | .................. | F02C 9/263 |
| | | | | 137/118.02 |
| 7,152,620 B2 * | 12/2006 | Baumgarten | ....... | F16K 11/0746 |
| | | | | 137/625.46 |
| 8,763,640 B2 * | 7/2014 | Kojima | ................ | F16K 11/074 |
| | | | | 277/589 |
| 9,234,684 B2 * | 1/2016 | Kojima | .................. | F25B 41/20 |
| 11,156,306 B2 * | 10/2021 | Yokoe | ...................... | H02K 1/30 |
| 2017/0254604 A1 * | 9/2017 | Sheppard | ................ | F01P 11/08 |
| 2022/0090700 A1 * | 3/2022 | Hamada | ................ | F16K 11/074 |
| 2022/0186657 A1 * | 6/2022 | Higuchi | ............... | F16K 11/074 |
| 2022/0186840 A1 * | 6/2022 | Kimura | ............. | B60H 1/00485 |
| 2022/0196157 A1 * | 6/2022 | Mizunuma | ........... | F16K 31/041 |

* cited by examiner

VALVE FOR CONTROLLING A COOLANT CIRCUIT

This application claims priority to German Application No. 102021109701.0 filed Apr. 16, 2021, which is hereby incorporated herein by reference in its entirety.

The invention relates to a valve for controlling a coolant circuit of a refrigerating system, preferably with a heat pump function.

A multi-way valve for controlling a coolant circuit is known from DE 10 2017 102 841 A1. This multi-way valve comprises a housing, in which a valve arrangement is provided with a rotary slide arrangement. The housing comprises a first and a second inlet opening, which is connected to a regulating chamber. A first and second outlet opening in the housing are also connected to the regulating chamber. The rotary slide arrangement is controlled via a shaft, which is driven by a motor. Several switching positions for controlling the coolant circuit and a service position can be controlled by such a multi-way valve.

The object of the invention is to propose a valve with a rotary slide arrangement for controlling a coolant circuit, which enables a sealing control of switching positions regardless of a current direction of a coolant current through the valve.

This object is solved by a valve for controlling the coolant circuit, in which valve a rotary slide arrangement of the valve arrangement has a control disc and at least one rotary slide support, wherein the control disc is rotatable in relation to the rotary slide support, which is provided non-rotationally in the housing and is allocated to the at least two outlets in the housing. Here, the rotary slide support is stored floatingly in the housing. This floating arrangement of the rotary slide support has the advantageous that the rotary slide support is arranged in the housing without strain. Thus, a planar contact of the at least rotary slide support on the control disc can be made possible, whereby a tight arrangement between the control disc and the at least one rotary slide arrangement is obtained regardless of a through-flow direction of the coolant and/or a switching position.

It is preferably provided that the rotary slide support is floatingly mounted in the housing in the axial direction towards the longitudinal axis of the at least one outlet opening. This rotary slide support can be positioned in the housing without tension in relation to the at least one outlet opening. Thus, a tensioning or holding force cannot act on the rotary slide support, which would lead to a non-planar abutment on the control disc and thus to leaks.

It is preferably provided that the rotary slide support is held by a receiving adapter, which can be connected to the housing. Thus, a tensioning or holding force can be received by the receiving adapter for non-rotationally fixing the rotatory slide support on the housing, wherein the tensioning or holding force only acts between the receiving adapter and the housing. The rotary slide support can be floatingly mounted or held without tension and preferably at least in the axial direction in relation to the longitudinal direction of the at least one outlet opening.

Furthermore, it is preferably provided that the receiving adapter between an end face of the receiving adapter and a support surface of the rotary slide support, which is opposite the sealing surface pointing towards the control disc, is provided with an elastically flexible element. Thus, the rotary slide support can be held with an at least minimal spacing or axial gap in relation to the end face of the receiving adapter. This makes it possible that even low angle deviations from a longitudinal axis of the valve arrangement by this elastically flexible element can be compensated for in the event of a rotational movement of the control disc for controlling a coolant flow itself. A planar attachment of the rotary slide support to the control disc and thus sealing design of the rotary slide arrangement can be maintained.

The elastically flexible element between the rotary slide support and the receiving adapter is preferably provided in a recess in the end face of the receiving adapter. Alternatively, the elastically flexible element can also be provided in a recess of the rotary slide support or the support surface of the rotary slide support. Thus, a constructively simple design can be created. Preferably, the elastically flexible element can be provided to be positionally fixed in the recess. This recess is formed circularly and respectively surrounds an outlet opening or at least two outlet openings at the same time. Preferably, the recess can have a slant, which points in the direction of a passage opening in the adapter receiver. Thus, the elastically flexible element can be held to be fixed radially outwards, in order to ensure a secure positioning of the elastically flexible element in the recess.

The receiving adapter for receiving the rotary slide support preferably has a holding portion surrounding the end face and provided on the outer periphery of the end face, said holding portion engaging around a fixing portion provided on an outer periphery of the rotary slide support. Thus, on one hand it is made possible for the rotary slide support to be fixedly held in the radial direction in relation to the receiving adapter and, on the other hand, can be positioned with clearance in the axial direction in relation to the end face of the receiving adapter, which is aligned in the radial direction in relation to the longitudinal axis of the outlet opening in the housing.

The holding portion of the receiving adapter can have a cylindrical peripheral surface based on the end face, through which the fixing portion of the rotary slide support is centrally guided, and can comprise a gripping edge on an end face side end of the peripheral surface, said gripping edge engaging around or behind the fixing portion. As a result of such a design, a simple mounting of the rotary slide support in relation to the receiving adapter can also be made possible, in particular with the design of the gripping portion made of a material, which can be crimped, stamped or pressed, for example.

Advantageously, an axial clearance between the support surface of the rotary slide support and the end face can be able to be set by the height of the cylindrical peripheral surface and/or the length of the gripping element of the holding portion and/or the height of the fixing portion on the rotary slide support. Advantageously, this axial clearance is designed to be greater than 0.01 mm. The elastically flexible element can thus hold the support surface of the rotary slide support at a distance apart from the end face of the receiving adapter.

A further preferred design of the receiving adapter provides that it has at least one plugging sleeve, which can be plugged into the at least one outlet opening in the housing of the valve. Thus, a simple mounting and positional fixing of the receiving adapter can be carried out.

According to a preferred embodiment, it is provided that the plugging sleeve is pressed into the outlet opening on the receiving adapter. Thus, a sealing arrangement between the plugging sleeve and the house can be created in a simple manner. Alternatively, it can also be provided that a sealing element, in particular a sealing ring or an O-annular seal, can be used in a sealing manner between the plugging sleeve and the at least one outlet opening in the housing.

At least one spring element is provided between the receiving adapter and a base of the housing and adjacently to the outlet opening. This makes it possible for the receiving adapter to be mounted axially shiftably in relation to the base in the housing.

The base in the housing can simultaneously form a limit of the regulating chamber. As a result of this resilience, tolerances of the valve arrangement and/or a regulating chamber of the housing and/or changes dependent on the temperature can also be compensated for. The valve arrangement can be used by a plugging opening into the housing and is positioned in the regulating chamber with the rotary slide arrangement pointing to the adapter receiver.

The spring element for flexibly receiving the receiving adapter to the housing or to the at least one outlet opening in the housing can be formed as a wave spring, coil spring, disc spring, rubber spring element or as an O-annular seal. Such a spring element can be selected and used depending on the pressures prevalent in the regulating chamber and other geometric requirements.

The rotary slide support is preferably formed from ceramic. For the most part, the control disc is also formed from ceramic, such that the same pair of materials forming the rotary slide arrangement abut on one another. Alternatively, the rotary slide support can also be formed from a metal with a polished or lobed surface and/or with a sliding coating or made of a plastic with a sliding coating.

The adapter receiver is preferably formed from a metallic material. This can be selected in terms of the use of the medium to be controlled. For example, a noble metal or also a light metal can also be used.

According to a preferred embodiment of the valve, it is provided that a receiving adapter can respectively be inserted into each outlet opening of the housing, which receiving adapter receives only one rotary slide receiver. Thus, for example with two outlet openings, each rotary slide support independent of the other can abut on the control disc with its sealing surface and, independently of the other rotary slide support, a compensation is made possible at an offset and/or in tolerances for a sealed arrangement.

According to a further preferred embodiment of the valve, it is provided that, starting from the longitudinal axis of the outlet opening or the inlet opening, a radius R1 up to a sealing line on the housing is given, on which a sealing ring abuts and seals the attachment opening or the inlet opening radially to the housing and, starting from the longitudinal axis of the outlet opening or the inlet opening, a radius R2 up to a sealing line formed between the rotary slide and the rotary slide support is given and that the ratio of R1:R2 ranges from 0.25 and 4. Thus, depending on the acting pressures and/or their active direction, a pressing force of the rotary slider on the rotary slide support or a release or lifting of the rotary slide from the rotary slide support is set.

The invention and further advantageous embodiments and developments thereof are described and explained in more detail below by means of the examples depicted in the drawings. According to the invention, the features that can be seen in the description and the drawings can be applied individually or collectively in any combination. Here are shown.

Figure 1:
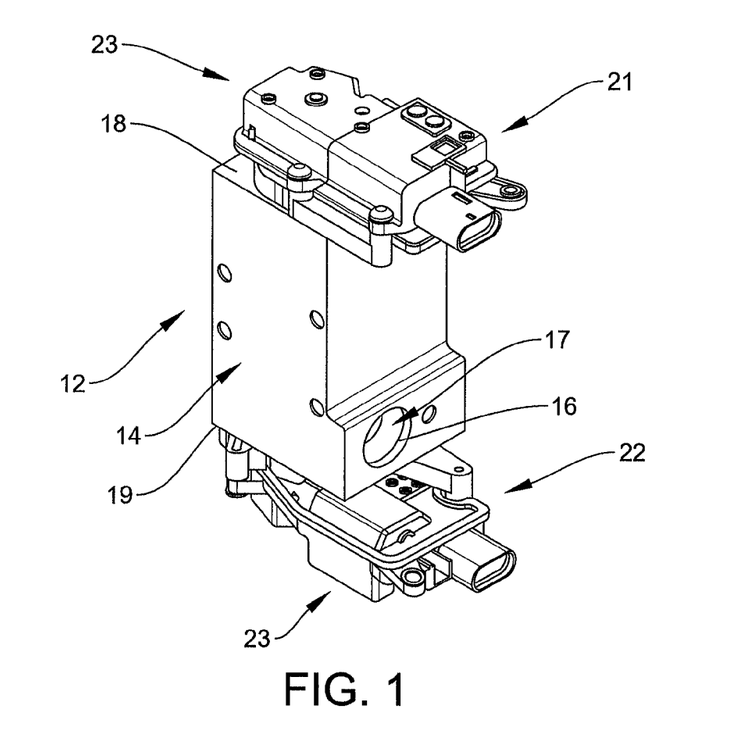
FIG. 1 a perspective view of a multi-way valve.

In FIG. 1, a perspective view of a valve 11 is depicted. This valve 11 is formed as a multi-way valve. This multi-way valve can serve to control a coolant circuit of a refrigeration system with heat pump function.

Figure 2:
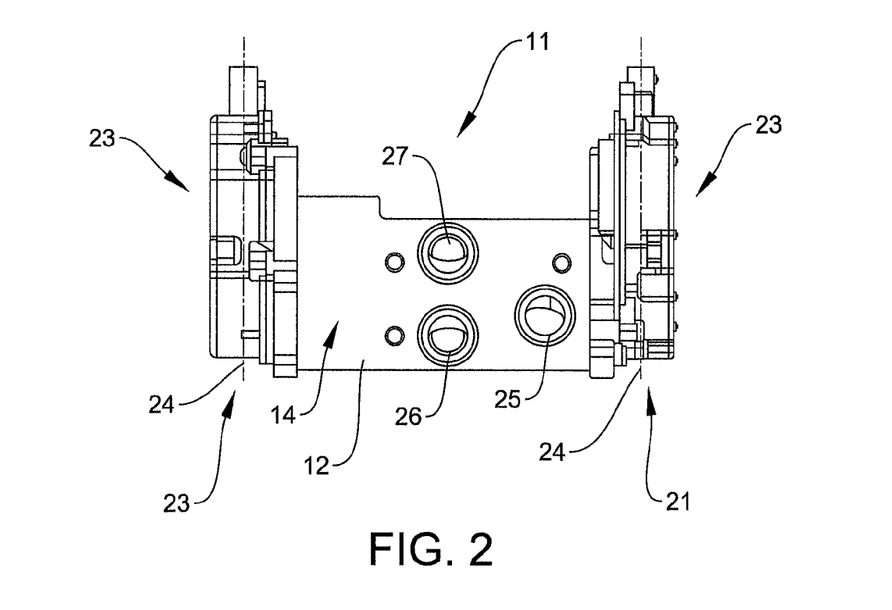
FIG. 2 a schematic side view of the multi-way valve according to FIG. 1.

This valve 11 comprises a housing 12, which has a rectangular cross-section, for example. This housing 12 has a mounting interface 14 on an end face, in which bores, for example, are provided for attaching fastening elements. A port 16 for a coolant supply or removal is provided on a further side surface. A first valve arrangement 21 and, opposite this, a second valve arrangement 22 is arranged on an end face 18 and an opposite end face 19 of the housing 12. In each case, only one drive 23 is to be provided on this valve arrangement 21, 22. The valve arrangements 21, 22 are described in more detail below in the sectional views according to FIGS. 3 to 5:

In a side view of the valve 11 according to FIG. 2, three further ports 25, 26, 27 are provided in a further side surface of the housing 12, for example. These ports 25, 26, 27 are provided on a side surface, which is preferably aligned in parallel to a longitudinal axis 24 of the drives 23.

According to a further preferred embodiment of the valve 11, it can be provided that all ports 16, 25, 26, 27 are arranged on a side surface of the housing 12. Alternatively, a port 16, 25, 26, 27 can also be provided on each side surface of the housing. The number of the ports per side surface 12 of the housing and their alignment can be adapted to the installation situation.

Figure 3:
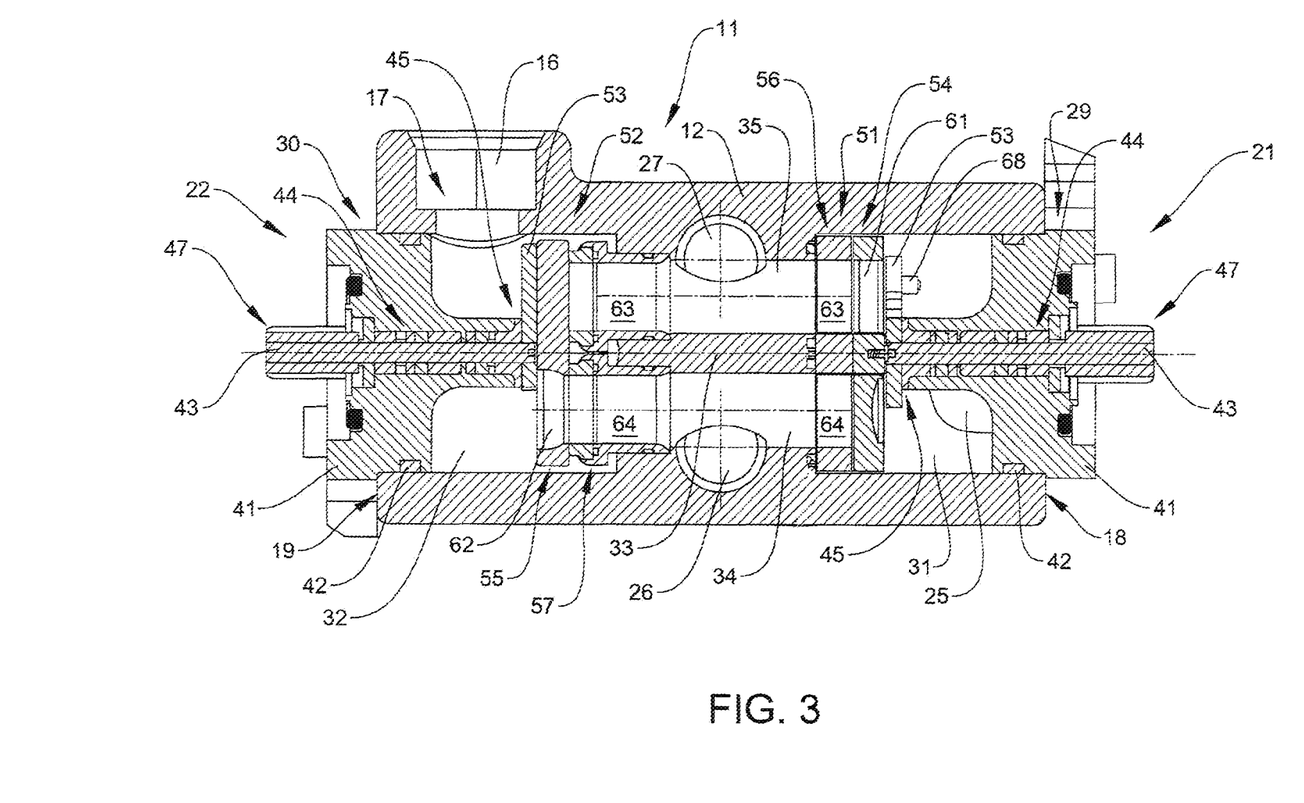
FIG. 3 a schematic longitudinal section of the multi-way valve according to FIG. 1, FIG. 4 a schematically enlarged sectional view of a multi-way valve arrangement of the multi-way valve according to FIG. 1, FIG. 5 a schematically enlarged view of the rotary slide arrangement according to FIG. 3 or FIG. 4

In FIG. 3, a longitudinal section of the valve 11 is depicted according to FIG. 1. The respective drives 23 of the first valve arrangement 21 and second valve arrangement 22 are depicted only partially.

This longitudinal section shows that the housing 12 for the valve 11 is preferably formed as a single piece. In each case, a plugging opening 29, 30 is provided on the end faces 18, 19, to which a regulating chamber 29, 30 is respectively attached. The first port 25 is allocated to the regulating chamber 31. Two channels 34, 35 are provided between the two regulating chambers 31, 32, wherein the one channel 34 is connected to the port 26 and the further channel 35 to the port 27. The second regulating chamber 32, which is opposite the first regulating chamber 31, is connected to the port 16.

Figure 4:
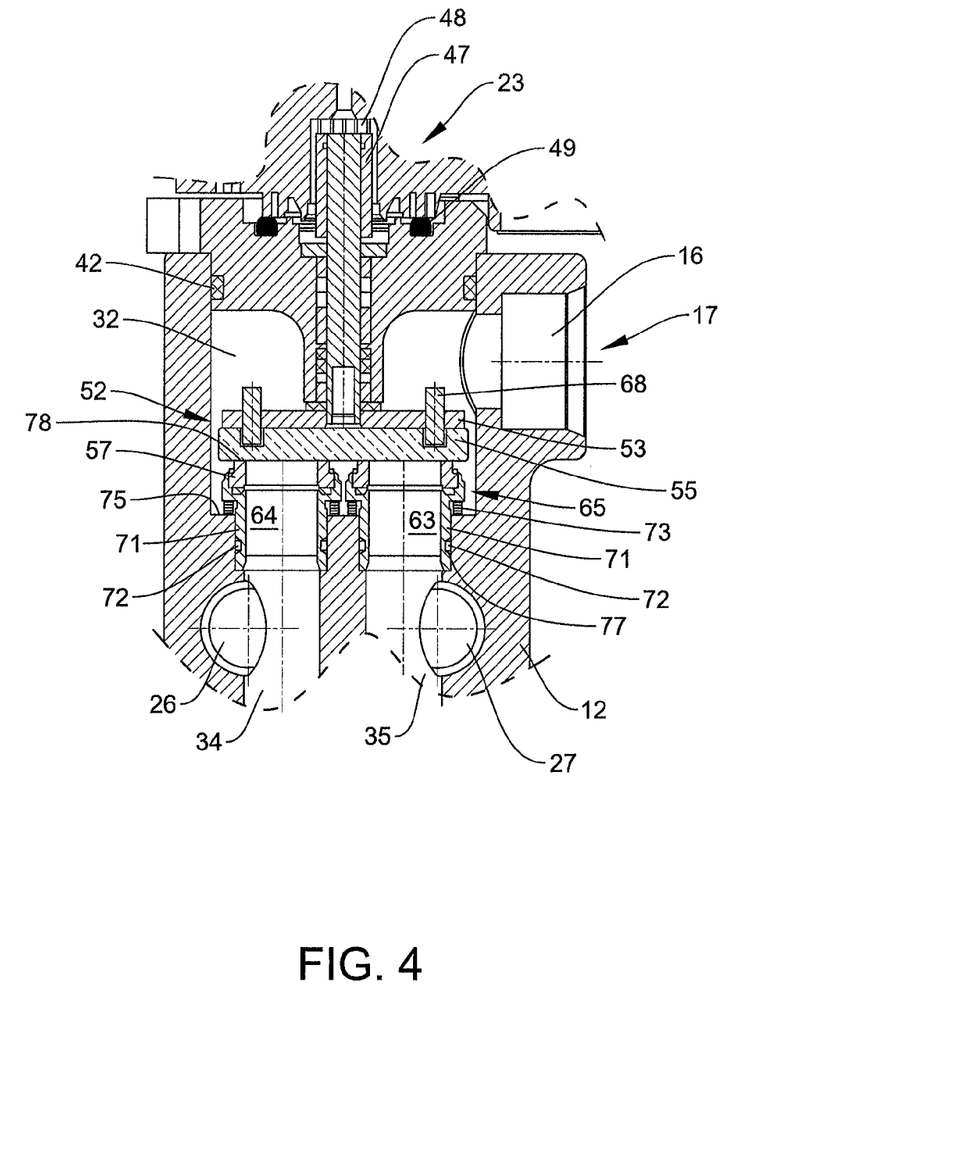

This valve 11 receives the first valve arrangement 21 and the second valve arrangement 22 opposite each other in the housing 12. These can each be plugged into the corresponding regulating chamber 31, 32 via the plugging openings 29, 30 and fixed therein via releasable fastening means not depicted in more detail. The valve arrangements 21, 22 have an analogous constructing. These comprise a base body 41, which can be inserted into the plugging opening 29, 30. At least one seal 42 is provided on the outer periphery of the base body in order to outwardly seal this regulating chamber 31, 32. In the base body 41, a shaft 43 is rotatably guided by a shaft mount 45. In addition, a seal to the regulating chamber is provided by a shaft seal 44, which is arranged between the shaft 43 and the base body 41. A toothed sprocket 47 is provided on an end face end of the shaft 43, said toothed sprocket being driven in a powered manner to a complementary drive element 48 of the drive 23 (FIG. 4).

In addition, at least one seal 49 (FIG. 4) can be provided between the base body 41 and the drive 23 or its housing.

Opposite the drive 23, the shaft 43 is connected to a rotary slide arrangement 51, 52. The rotary slide arrangement 51 of the first valve arrangement 21 preferably deviates from the rotary slide arrangement 52 of the second valve arrangement 22. The second valve arrangement 22 is described in more detail below in FIG. 4.

An driver 53 is provided between the rotary slide arrangement 51, 52 and the shaft 44, which driver is fixedly connected to the shaft 43 and controls a rotational movement of a rotary slide 54, 55 in relation to a rotary slide support 56, 57 of the rotary slide arrangement 51, 52. The shaft 43 is welded to the driver 53, for example, in particular welded with lasers, or soldered, crimped or riveted.

The port 25 is formed as an inlet for a coolant. Thus, in this first regulating chamber 31, high pressure is prevalent. The first valve arrangement 21 is provided on the high pressure side in the regulating chamber 31 and is formed correspondingly.

The ports 26, 27 are provided on the low pressure side. Furthermore, the second valve arrangement 22 is arranged on the low pressure side in the second regulating chamber 32. The port 16 is formed as an outlet. The ports 26, 27, which open out into the channels 34, 35, can be controlled both as the inlet and as the outlet, wherein these are supplied on the low pressure side independent of the control.

The inlet 25 from the housing 12 into the regulating chamber 31 and the port 16 from the second regulating chamber 32 out of the housing 12 are preferably provided off-centre in relation to the longitudinal axis of the respective valve arrangement 21, 22. These open out off-centre into the regulating chambers 31, 32 and supply the coolant with a rounded portion of the base body 41. Thus, a current-optimised supply and/or removal of the coolant is made possible. Furthermore, the entry edge of the port 25 into the regulating chamber 31 and an edge between the regulating chamber 32 and the outlet 16 has an inner chamfer, whereby a reduction of the pressure drop between the port 25 to the regulating chamber 31 and/or from the regulating chamber 32 to the port 16 is made possible. The ports 26, 27 are also positioned off-centre in relation to the channels 34, 35.

The regulating chambers 31, 32 are opposite one another and are aligned in relation to one another in such a way that, after inserting the first and second valve arrangement 21, 22, the longitudinal axes 33 of the shafts 43 preferably lie on a common longitudinal axis. The channels 34, 35 are aligned coaxially to the longitudinal axis of the housing 12 or the longitudinal axes 33 of the shafts 43. Alternatively, it can be provided that the longitudinal axes 33 of the shafts 43 can also be aligned offset to each other in parallel in a common housing 12. It is also possible that the longitudinal axes 33 of the two shafts 43 of the valve arrangement 21, 22 are arranged at an angle of <180° in a common housing 12.

Depending on the installation arrangement, an alignment of the regulating chambers 31, 32 at an angle of 90° or an angle of from 90° to 180° can also be provided, wherein the channels 34, 35 have geometries that are correspondingly favourable in terms of current.

The rotary slide arrangements 51, 52 each have a first rotatable rotary slide 54, 55, which comprise two through openings 61, 62, for example. Rotary slide supports 56, 57 are allocated to these rotary slides 54, 55. These also preferably each have two through openings 63, 64. The corresponding through openings can be blocked or completely released by a corresponding superposition or an offset of the first rotary slide 54, 55 to the rotary slide support 56, 57 and can individually or both be partially opened. This is described below in FIGS. 7 to 12 and 14. The respective through openings 63, 64 in the rotary slide support 56, 57 are aligned flushly to the channels 34, 35.

The rotary slide 54, 55 and the rotary slide support 56, 57 are preferably formed from ceramic. These can also be formed from plastic or metal.

With this design of the valve 11, the coolant entering via the port 25 designed as an inlet is supplied either only to the channel 34 or only to the channel 35, for example through the first valve arrangement 21, or both channels 34, 35 are each supplied proportionately with refrigerant. Depending on the switching position of the second rotary slide arrangement 52 of the second valve arrangement 21, a coolant present in the channel 34, for example, can flow out via the port 26 formed as an outlet. The same applies to the coolant provided in the channel 35, which can be removed via the port 27. A switching position can also be adopted, such that the port 16 formed as an outlet removes the coolant.

A schematically enlarged sectional view of the second valve arrangement 22 is depicted in FIG. 4, which is referred to below only as valve arrangement 22. This sectional view is rotated by 90° in relation to the sectional view in FIG. 3. Thanks to this sectional view, it is obvious that the driver 53 is attached and rotatably connected on the rotatable rotary slide 55 by means of pins 68. For example, the pin 68, in particular fitting pin, can be pressed into the driver 53 and engage in a recess in the rotatable rotary slide 55. Here, a press fit between pin 68 and the rotary slide 55 is preferably provided. Preferably, the pins 68 with a plastic sleeve are pressed into bores of the rotary slide 55 for the transfer of rotational moment free of transverse force. This connection between the driver 53 and the rotary slide 55 can also be provided with the rotary slide arrangement 51 according to FIG. 4.

The rotary slide arrangement 52 arranged in the second regulating chamber 32 is formed to deviate from the rotary slide arrangement 51 due to the prevalent pressure ratios. There is low pressure in the regulating chamber 32. The coolant is still present with high pressure in the channels 34, 35. In order to enable a sealing arrangement between the rotary slide support 57 of the second rotary slide arrangement 52 and the regulating chamber 32, it is provided that a plugging sleeve 71 is respectively inserted into the channel 34 and 35. This is sealed by means of a seal 72 to the outside of the channel 34, 35. This plugging sleeve 71 is shiftably positioned in the axial direction in relation to the longitudinal axis of the channels 34, 35. Preferably, a spring element 73 is positioned between a shoulder 74 of the plugging sleeve 71 and a base 75 of the regulating chamber 32. Thus, the plugging sleeve 71 is pressed in the direction of the rotary slide arrangement 52. When seen on the input side in the current direction, the plugging sleeve 71 can have a chamber 77 and form an arrangement favourable in terms of current. Opposite this, the plugging sleeve 71 can have an abutment surface or a receiver, in order to place in position against the rotary slide support 57 and/or engage on it. The rotary slide support 57 can be formed by two annular bodies, which are received and held on the plugging sleeve 71. In turn, these can abut with a sealing surface 78 or sliding surface on the rotatable rotary slide or the control disc 55.

The sectional view depicted in FIG. 4 can also be a valve 11, in which the ports 26, 27 can be omitted or closed, such that the housing 12 has a port 16 with an inlet opening 17 and two outlet openings 34, 35. The current direction of the medium can be provided by the inlet opening 17, in addition, or the outlet openings 34, 35. The current direction can also be carried out in the opposite direction, that is to say that the outlet opening(s) 34, 35 are formed as an inlet and the inlet opening 17 as an outlet.

The rotary slide arrangement 52 with the control disc 55 and with at least one rotary slide support 57, preferably in the form of a non-rotational control disc, can be controlled by the arrangement and receiver of the rotary slide support 57 in a receiving adapter, 65, which can preferably have the at least one plugging sleeve 71, in both through-flow directions.

Figure 5:
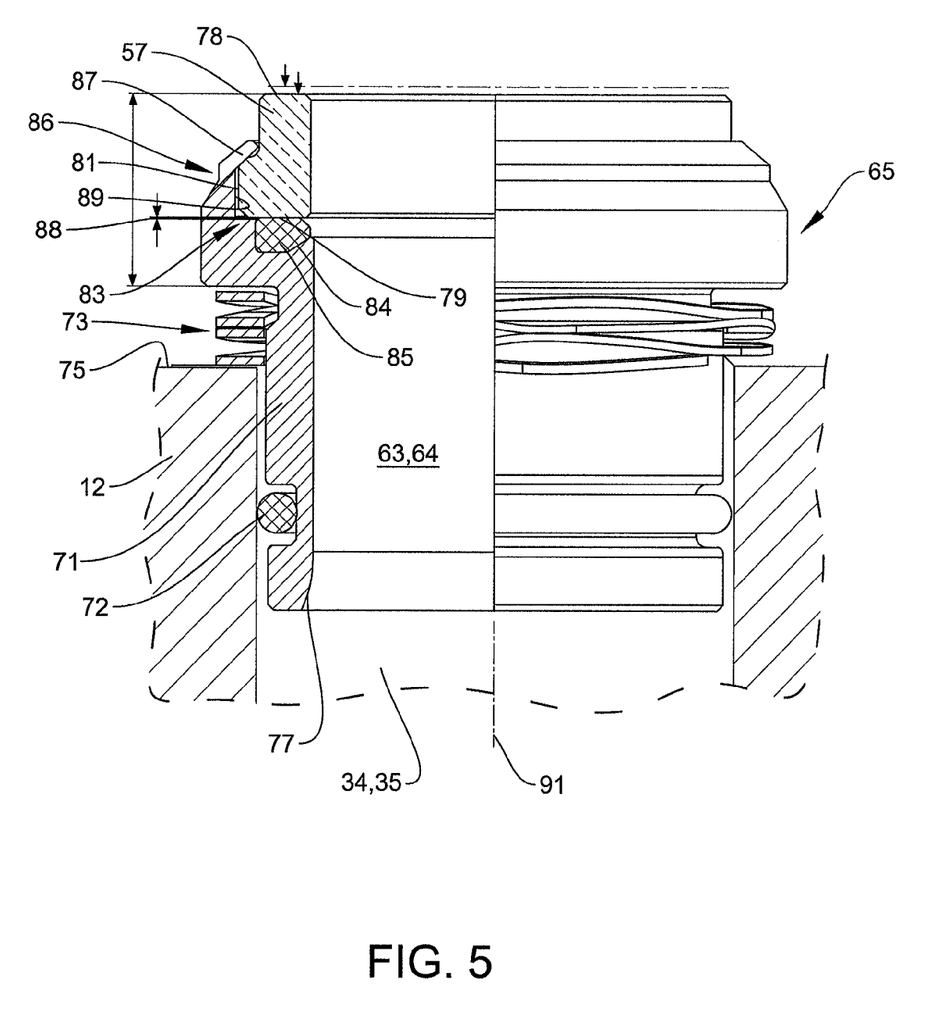

The first embodiment for an arrangement of the rotary slide support 57 in relation to the outlet opening 34, 35 is depicted in an enlarged manner in FIG. 5. This embodiment corresponds to that in FIGS. 3 and 4. The rotary slide support 57 is received and held by the receiving adapter 65. The rotary slide support 57 is formed as a circle and comprises the sealing surface 78, which points to the control disc 55 and abuts on this. The rotary slide support 57 has a support surface 79 opposite the sealing surface 78. A fixing portion 81 is provided on the outer periphery of the rotary slide support 57, said fixing portion comprising a greater outer periphery pointing to the support surface 79 than pointing to a sealing surface 78. The rotary slide support 57 is positioned in relation to an end face 83 of the receiving adapter 65. A recess 84 is provided in the end face 83, which serves to receive an elastically flexible element 84. This elastically flexible element 85 positions the support surface 69 of the rotary slide support 57 with a distance apart from the end face 83. The receiving adapter 65 furthermore comprises a holding portion 86. This comprises a cylindrical peripheral surface 89 and, opposite the end face 83, a gripping edge 87. This gripping edge 87 engages around or engages behind the fixing portion 81 of the rotary slide support 57. An axial gap 88 between the support surface 79 of the rotary slide support 57 and the end face 83 of the receiving adapter 65 is fixed by this gripping edge 87. Here, the rotary slide support 57 is fixed on the receiving adapter 65 by pre-tensioning the elastically flexible element 85 in relation to the end face 83. The rotary slide support 57 can be axially shiftable due to this axial gap 88 along a longitudinal axis 91 of the outlet opening 34, 35. At the same time, the rotary slide support 57 can compensate for a tilting movement in relation to the longitudinal axis 91 relative to the receiving adapter 65.

The receiving adapter 65 preferably has the plugging sleeve 71 arranged in one piece thereon. The at least one spring element 73 is provided for the sprung flexible arrangement of the receiving adapter 65 in the outlet opening 34, 35, in particular in the axial direction along the longitudinal axis 91. This spring element 73 can be formed as a coil spring, disc spring or similar. Preferably, a wave spring is provided.

Figure 6:
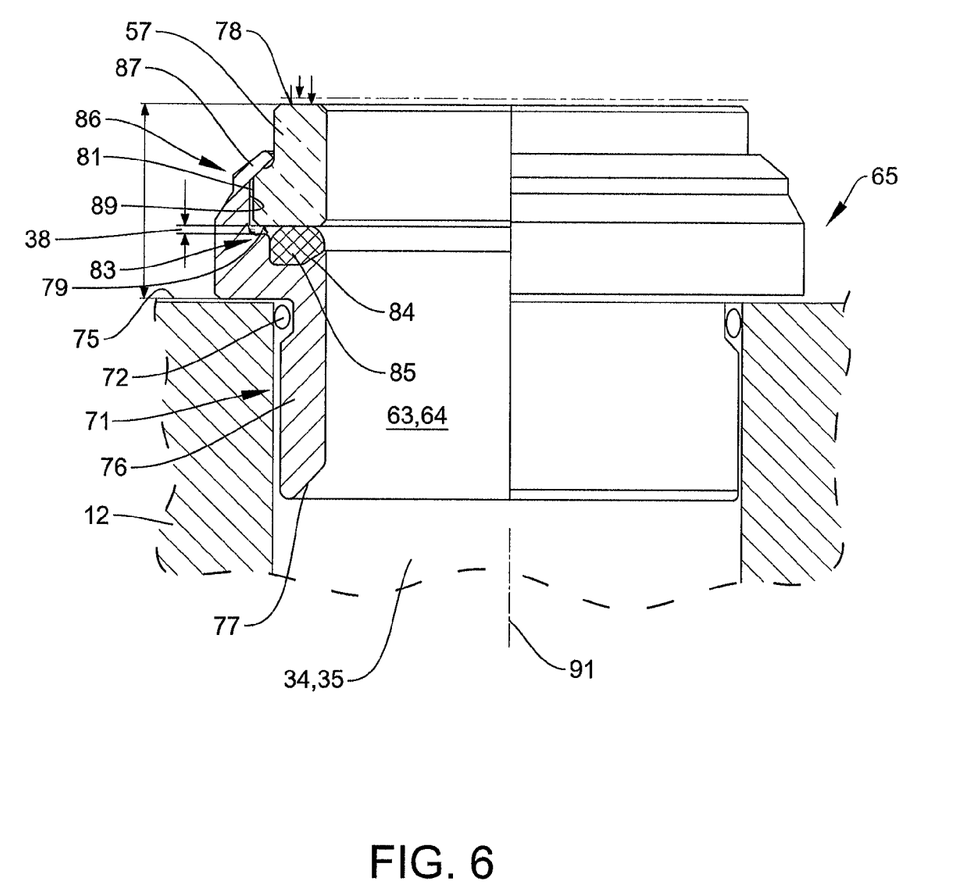
FIG. 6 a schematically enlarged sectional view of an alternative embodiment of the rotary slide arrangement to FIG. 5, FIG. 7 a schematic sectional view of a further alternative embodiment of the rotary slide arrangement to FIG. 3 or FIG. 4, FIG. 8 a schematically enlarged view of a further alternative embodiment of the rotary slide arrangement to FIG. 5, FIG. 9 a schematic view of an alternative arrangement to FIG. 8, FIG. 10 a schematic depiction of a further alternative arrangement to FIG. 9, and FIG. 11 a schematic sectional view of an alternative embodiment of a valve to FIG. 1.

In FIG. 6, an alternative design of the receiving adapter 65 is provided for receiving the rotary slide support 57 according to FIG. 5. In this embodiment, it is provided that the plugging sleeve 71 is formed as a pressing sleeve, which is pressed directly into the outlet opening 34, 35. Thus, the sealing element 72 and the spring element 73 can be omitted according to the embodiment in FIG. 5.

The arrangement and reception of the rotary slide support 57 to the end face 83 of the receiving adapter 65 corresponds to the embodiment according to FIG. 5. However, in this embodiment according to FIG. 6, it can be provided that the axial gap 88 is dimensioned to be larger than in the embodiment according to FIG. 5, since the spring element 73 is omitted in the embodiment according to FIG. 6. Thus, in turn a sufficient adjustment to tolerance can be carried out after inserting the valve arrangement 22 into the regulating chamber 32 of the housing 12.

Figure 7:
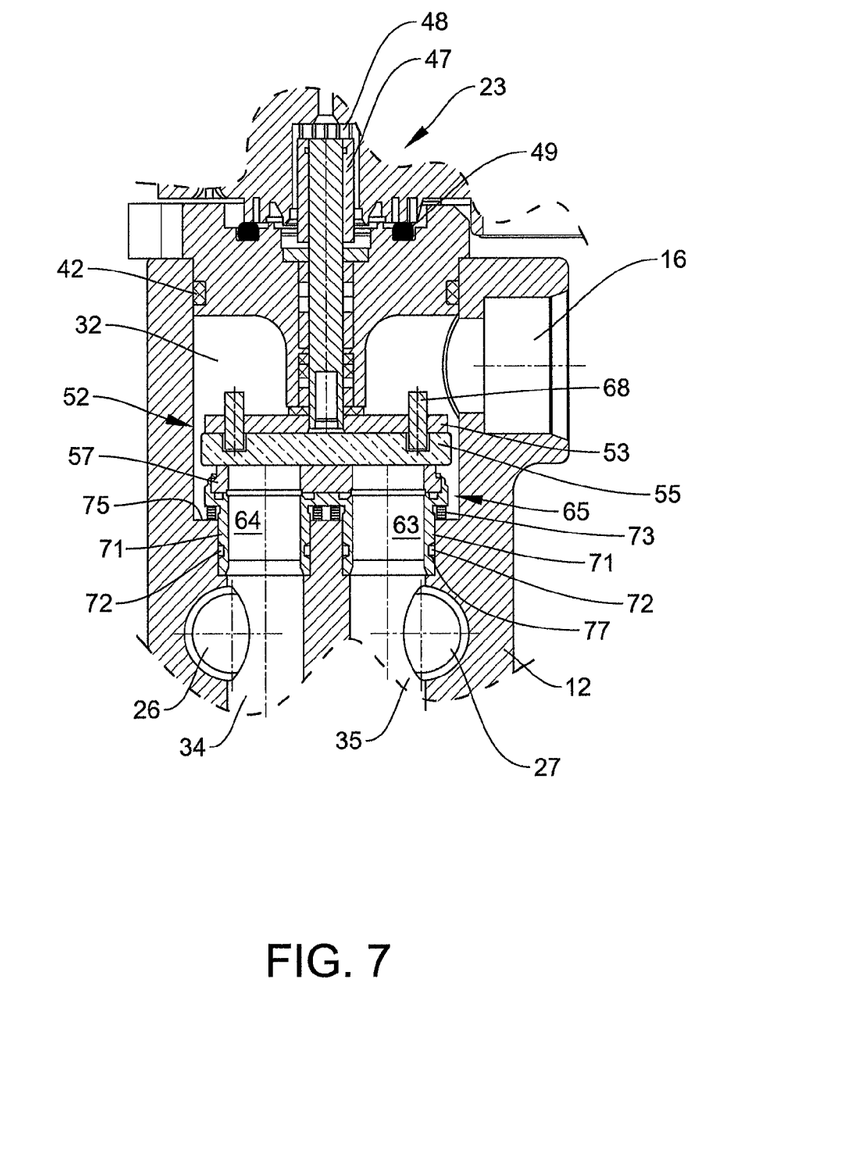

In FIG. 7, an alternative embodiment of the rotary slide support 52 to FIG. 3 or 4 is depicted. Deviating from this, the rotary slide support 57 can be formed as a single annular body, which has one or more through-openings 61. This single rotary slide support 57 is received by the receiving adapter 65, preferably with at least two through-openings 63, 64. The arrangement and fixing of this rotary slide support 57 to the receiving adapter 65 can be carried out analogously to the embodiments in FIGS. 5 and 6. The receiving adapter 65 has two plugging sleeves 71 opposite the end face 83 of the rotary slide support 57, said plugging sleeves being able to be inserted into the outlet openings 34, 35. These plugging sleeves 71 can each be formed separately or can be provided together on the receiving adapter 65, preferably integrally.

Figure 8:
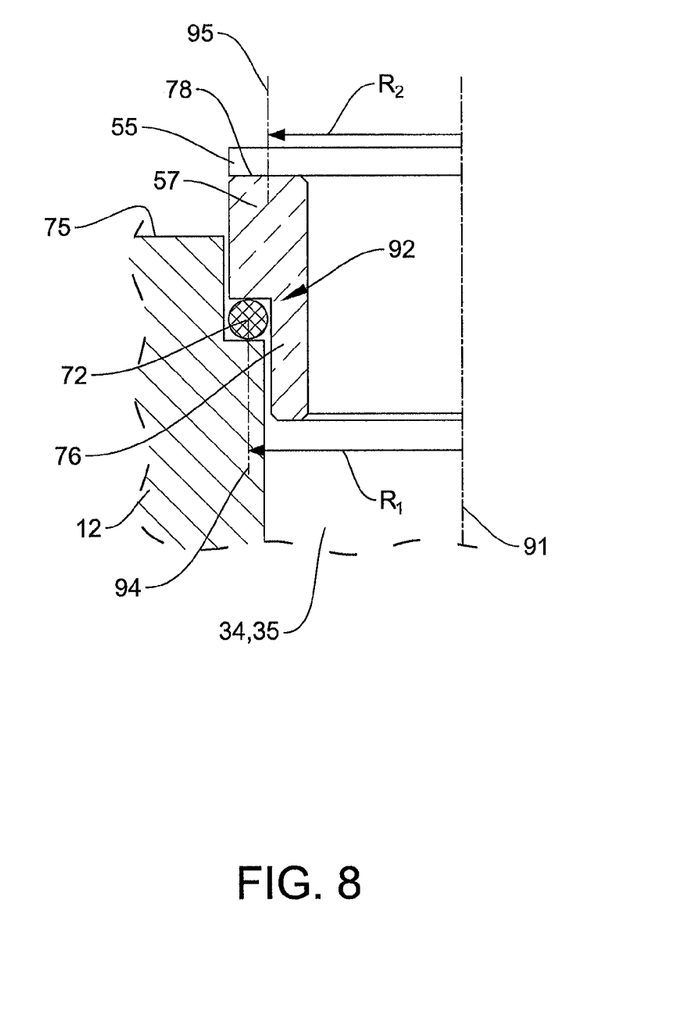

A schematically enlarged partial view of an alternative embodiment of the receiving adapter 65 of the second rotary slide arrangement 52 is depicted in FIG. 8. This alternative embodiment is reduced in the terms of the number of components. The rotary slide support 57 and the receiving adapter 65 and the plugging sleeve 71 with a sleeve position 76 are fused to one another in a common component. Thus, an annular body is provided which comprises the sealing surface 78 on its upper end face. Opposite this, the sleeve portion 76 is formed, such that this constructively simply formed rotary slide support 57 can be plugged and positioned into the outlet opening 34, 35. The sleeve portion 76 is formed to be narrower than a sealing surface 78 in terms of the wall thickness, such that a shoulder 92 is formed in the transition region. A shoulder is also formed in a transition region between the base 75 of the housing 12 and a wall portion of the outlet opening 34, 35, which shoulder is adjusted to the shoulder 92 in terms of dimensions. Thus, a sealing element 72, in particular sealing ring, can be positioned between the two shoulders, in order to guide the sleeve portion 76 in a sealing manner in the outlet opening 34, 35. Advantageously, the rotary slide support 57 is formed from ceramic, in particular as a ceramic ring, which is mounted in a sprung manner in the outlet opening 34, 35 by means of the sealing element 72.

In this embodiment, a radius R1 extends from the longitudinal axis 91 of the outlet opening 34, 35 up to a sealing line 94, which is provided between the housing 12 and the shoulder on the housing 12, which is adjacent to the outlet opening 34, 35. A sealing effect is provided between the rotary slide 55 depicted in FIG. 8 and the sealing surface 78 of the rotary slide support 57, which sealing effect forms a sealing line 95 centrally on the width of the sealing surface 78. The radius R2 extends from the longitudinal axis 91 to the sealing line 95. The radius R2 is marginally smaller than the radius R1. By shifting the sealing line 95 radially outwardly, the radius R2 can correspond to the radius R1 or can also be larger. In the example depicted as with in the event of R1 and R2 being the same, the same force ratios in relation to pressing the medium onto the rotary slide support 57, on one side, and a reaction force of the rotary slide support 57 in the direction of the rotary slide 55, on the other side, can exist. These ratios also apply analogously to the embodiments according to FIGS. 5, 6 and/or 7. The radius R1 describes the radius between the seal 72 on the housing 12 and the longitudinal axis 91. The radius R2 describes the radius between the sealing surface 78 and the abutting rotary slide 55 in relation to the longitudinal axis 91 or a resulting sealing line 95.

The rotary slide arrangement 52 can be supplied with a pressure supply by the medium to be controlled in both directions. On one hand, the medium under pressure can be supplied to the housing 12 via the inlet opening 17 and thus, on the input side, can act on the second rotary slide arrangement 52 or firstly on the rotary slide 55. Alternatively, the medium under pressure can also be supplied to the housing 12 via the outlet opening 34, 35, such that firstly the rotary slide support 57 is supplied with pressure on the pressure input side, which then acts on the rotary slide 55.

Depending on the type of operation and/or depending on the design ratios, different pressing ratios can be created by the geometry of the rotary slide 55 and the rotary slide support 57.

Figure 9:
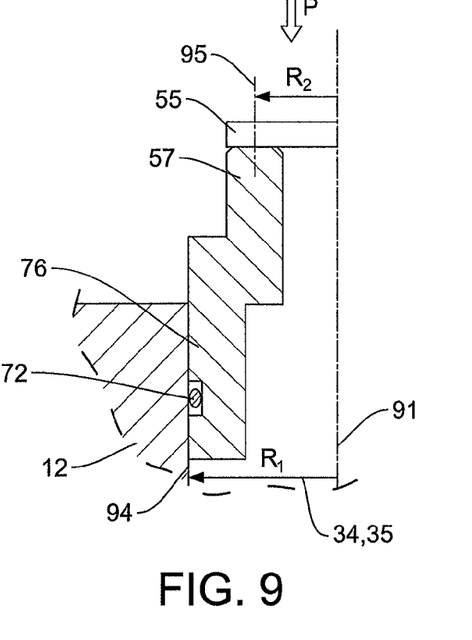

A further embodiment to FIG. 8 is depicted in FIG. 9. The radius R1 is formed to be greater than the radius R2. The radius R1 extends between the longitudinal axis 91 and the peripheral wall of the outlet opening 34, 35, on which the sealing 72 abuts. With a pressure acting on the rotary slide arrangement 52 via the inlet opening 17, a reduced pressure acts on the rotary slide 55 in comparison to the embodiment according to FIG. 8. If the rotary slide arrangement 52 is supplied with pressure via the outlet opening 34, 35, an increased pressure force of the rotary slide support 57 can be obtained on the rotary slide 55. Thus, even with high pressure, a secure abutment and sealing between the sealing surface 78 of the rotary slide support 57 and the rotary slide 55 can be given by choosing the radius R1 in relation to the R2.

Figure 10:
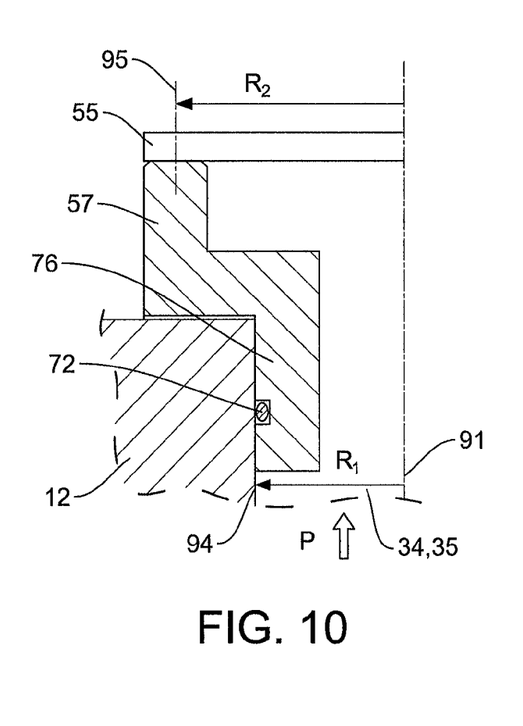

An alternative embodiment to FIG. 9 in terms of geometry of the rotary slide 55 and the rotary slide support 57 is depicted in FIG. 10. In this embodiment, the radius R1 is formed to be smaller than the radius R2. Due to the bigger surface of the rotary slide 55 caused by the radius R2, a low pressing force of the rotary slide support 57 on the rotary slide 55 is obtained, if the medium under pressure is supplied via the outlet opening 34, 35 and flows away via the inlet opening 17. If the flowing direction of the medium under pressure is reversed, i.e. the medium is supplied via the inlet opening 17, a high pressing force of the rotary slide 55 on the rotary slide support 57 can be obtained and can be given by an increased denseness between the rotary slide 55 and the rotary slide support 57.

Figure 11:
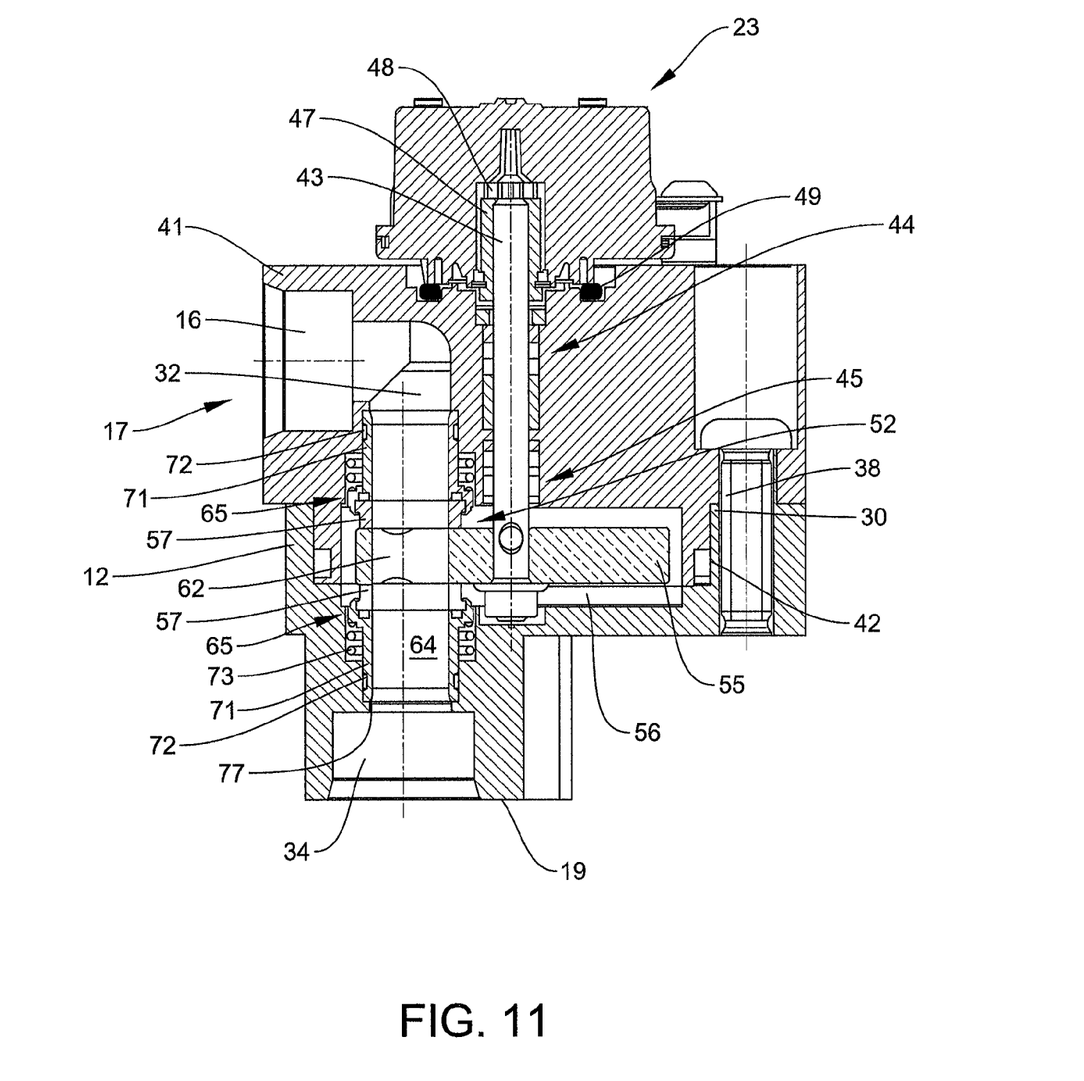

A schematic sectional view of an alternative embodiment of the valve 11 formed as a multi-way valve according to FIG. 1 is depicted in FIG. 11. This embodiment of the valve 11 is a single-way valve. This single-way valve 11 comprises a through-flow channel, which can be opened or closed. Different cross-sections between a closed and open position can also be controlled. This single-way valve 11 is preferably formed as so-called bi-flow valve. A through-flow of the medium and control of the volume flow through the valve can selectively be carried out in both current directions.

The valve 11 comprises a housing 12, which has an outlet opening 34 with a port on an end face 19. A plugging opening 30 is provided opposite this end face 19, in which plugging opening a valve arrangement 22 can be positioned. This valve arrangement 22 comprises a base body 41, which can be inserted into the plugging opening 30 and can be connected, in particular screwed, to the housing 12, for example with a fixing means 38. At least one seal 42 is provided between the base body 41 and the housing 12. Thus, this interface is sealed. Furthermore, this seal 42 also serves to seal a regulating chamber 32 to the outside. In the base body 41, a shaft 43 is rotationally guided through a shaft bearing 45. In addition, a seal to the regulating chamber 32 is provided by a shaft seal, which is arranged between the shaft 43 and the base body 41. A toothed sprocket 47 is provided on an end-face end of the shaft 43, which is connected in a driven manner to a complementary drive element 48 of the drive 23.

In addition, a seal 49 can be provided between the base body 41 and the drive 23 or its housing.

Opposite the drive 23, the shaft 43 is connected to a rotary slide arrangement 52. This rotary slide arrangement 52 deviates partially from the rotary slide arrangement 51, 52 according to FIG. 4. This rotary slide arrangement 52 comprises a rotary slide 55, which is non-rotationally connected to the shaft 43. This rotary slide 55 is positioned to be freely rotatable in a housing portion 56, which is formed between the base body 41 and the housing 12.

The base body 41 has a port 16 which transitions into an inlet opening 17. This inlet opening 17 opens out via the regulating chamber 32 to the rotary slide 55. Opposite this, the outlet opening 34 is provided. A regulating chamber 32 is also formed between the rotary slide 55 and the outlet opening 34. Depending on the current direction of the medium through the valve 11, the regulating chamber 32 is respectively formed upstream of the rotary slide 55. A high pressure is present in this regulating chamber 32.

Alternatively, the port 16 can be arranged on the housing 12 analogously to the embodiment according to FIG. 4, and the base body 41 can be inserted from above into the housing 12.

The rotary slide 55 of the rotary slide arrangement 52 has at least one through opening 62. A superposition or an offset of the rotary slide 55 in relation to the rotary slide support 57 can be controlled by controlling a rotary movement of the rotary slide 55, such that the at last one passage opening 62 is blocked, partially opened or completely opened. In each case, a rotary slide support 57 is arranged on both sides of the rotary slide 55. The two opposite rotary slide supports 57 can be formed to be the same. Preferably, the rotary slide supports 57 can have an embodiment according to FIGS. 5, 6, 8, 9 and/or 10, such that reference is respectively made to the full extent to these embodiments.

As a result of the opposite arrangement of the rotary slide supports 57 to the rotary slide 55, the rotary slide 55 can be mounted so that it can move up and down relative to the shaft 43 in the axial direction, i.e. in a floating manner. In the rotational direction, a non-rotational connection between the rotary slide 55 and the shaft 43 is preferably provided. Due to this floating mounting of the rotary slide 55 between the rotary slide supports 57 arranged at a mirror-image to in the rotary slide 55, the valve 11 can be flowed through in both directions. In addition, independent of the respective through flow direction, the same ratios can be given for the rotary slide arrangement 52. Thus, this valve 11, in particular this single-way valve 11, can be used universally.

| | |
|---|---|
| 11. | valve |
| 12. | housing |
| 13. | |
| 14. | mounting interface |
| 15. | |
| 16. | port |
| 17. | inlet opening |
| 18. | end face |
| 19. | end face |
| 20. | |
| 21. | first valve arrangement |
| 22. | second valve arrangement |
| 23. | drive |
| 24. | longitudinal axis |
| 25. | port (Port 1) |
| 26. | port (Port 2) |
| 27. | port (Port 3) |
| 28. | |
| 29. | plugging opening |
| 30. | plugging opening |
| 31. | regulation chamber |
| 32. | regulation chamber |
| 33. | |
| 34. | channel |
| 35. | channel |
| 36. | |
| 37. | |
| 38. | |
| 39. | |
| 40. | |
| 41. | base body |
| 42. | seal |
| 43. | shaft |
| 44. | shaft seal |
| 45. | shaft mount |
| 46. | |
| 47. | sprocket |
| 48. | drive element |
| 49. | Seal |
| 50. | |
| 51. | rotary slide arrangement |
| 52. | rotary slide arrangement |
| 53. | driver |
| 54. | rotary slide |
| 55. | rotary slide |
| 56. | |
| 57. | rotary slide support |
| 58. | |
| 59. | |
| 60. | |
| 61. | through opening |
| 62. | through opening |
| 63. | through opening |
| 64. | through opening |
| 65. | receiving adapter |
| 66. | |
| 68. | pin |
| 69. | |
| 70. | |
| 71. | plugging sleeve |
| 72. | sealing element |
| 73. | spring element |
| 74. | shoulder |
| 75. | base |
| 76. | sleeve portion |
| 77. | chamber |
| 78. | sealing surface |
| 79. | support surface |
| 80. | |
| 81. | fixing portion |
| 82. | |
| 83. | end face |
| 84. | recess |
| 85. | flexible element |
| 86. | holding portion |
| 87. | gripping edge |
| 88. | Axial gap |
| 89. | Cylindrical peripheral surface |
| 90. | |
| 91. | Longitudinal axis |
| 92. | shoulder |
| 93. | |
| 94. | sealing line |
| 95. | sealing line |

The invention claimed is:

1. A valve for controlling a coolant circuit of a refrigerating system comprising:
a housing, which has at least one inlet opening and at least one outlet opening,
a regulating chamber provided in the housing, which extends between the at least one inlet opening and the at least one outlet opening,
a plugging opening provided on the housing, which is adjacent to the regulating chamber,
a valve arrangement, which is insertable at least partially into the regulating chamber, by means of which a flow path of a medium between the at least one inlet opening and the at least one outlet opening is controllable,
a rotary slide arrangement, arranged in the regulating chamber of the valve arrangement, which has a control disc, which is rotatable in relation to at least one rotary slide support, wherein the at least one rotary slide support is provided non-rotationally to the housing and is allocated to the at least one outlet opening,
the at least one rotary slide support is mounted floatingly to the housing,
wherein the at least one rotary slide support is held by a receiving adapter, and the receiving adapter is at least in part inserted in the housing,
wherein the receiving adapter has a holding portion surrounding an end face and abutting on an outer periphery, which engages around a fixing portion of the rotary slide support, and
an axial clearance is settable between a support surface of the rotary slide support and the end face of the receiving adapter by a gripping edge of the holding portion.

2. The valve according to claim 1, wherein the at least one rotary slide support is mounted floatingly in the axial direction to the longitudinal axis of the at least one outlet opening and/or the at least one inlet opening.

3. The valve according to claim 2, wherein the at least one rotary slide support engages in the outlet opening at least in sections, or by a sleeve portion arranged thereon, and is mounted floatingly to the housing.

4. The valve according to claim 1, wherein an elastically flexible element is provided between an end face of the receiving adapter and a support surface of the rotary slide support, which is opposite the sealing surface pointing towards the control disc of the rotary slide support.

5. The valve according to claim 4, wherein the elastically flexible element is provided in a recess of the end face and/or the support surface.

6. The valve according to claim 1, wherein the rotary slide support comprises a cylindrical fixing portion on the outer periphery of the rotary slide support.

7. The valve according to claim 1, wherein the holding portion has a cylindrical peripheral surface starting from the end face of the receiving adapter, by means of which the rotary slide support is guided centrally to the receiving adapter and has a gripping element on an end face end, which engages around or engages behind the fixing portion of the rotary slide support.

8. The valve according to claim 1, wherein the axial clearance is greater than 0.01 mm.

9. The valve according to claim 8, wherein the at least one spring element is formed as a wave spring, coil spring, disc spring, O-ring seal or rubber spring element.

10. The valve according to one of claim 1, wherein the receiving adapter has at least one plugging sleeve, which is pluggable into the at least one outlet opening in the housing.

11. The valve according to claim 10, wherein the plugging sleeve is pressed into the outlet opening or is plugged into the outlet opening in a sealing manner with a sealing ring.

12. The valve according to claim 1, wherein at least one spring element is provided between the receiving adapter and a base of the housing, or the base in the regulating chamber, adjacent to the outlet opening.

13. The valve according to claim 1, wherein the rotary slide support is formed from ceramic, or the rotary slide support is formed from a metal with a polished or lobed surface and/or with a sliding coating, or the rotary slide support is formed from a plastic, or from plastic with a sliding coating.

14. The valve according to claim 1, wherein the receiving adapter is formed from a metallic material, in particular noble metal or light metal, or made of plastic or a metal plastic compound material.

15. The valve according to claim 1, wherein the housing comprises at least one outlet opening, a receiving adapter is insertable in the at least one outlet opening and each receiving adapter receives one rotary slide support.

16. The valve according to claim 1, wherein, starting from the longitudinal axis of the outlet opening or the inlet opening, a radius $R_1$ up to a sealing line on the housing is given, on which a seal abuts and seals a port opening or the inlet opening radially to the housing and, starting from the longitudinal axis of the outlet opening or the inlet opening, a radius $R_2$ up to a sealing line formed between the control disc and the rotary slide support is given, and the ratio of $R_1:R_2$ ranges from 0.25 and 4.

* * * * *